United States Patent [19]

Deister et al.

[11] Patent Number: 5,494,173
[45] Date of Patent: Feb. 27, 1996

[54] VIBRATING SCREEN APPARATUS FOR USE IN NON-LEVEL OPERATING CONDITIONS

[75] Inventors: E. Mark Deister, Fort Wayne; Dale A. Loshe, New Haven, both of Ind.

[73] Assignee: Deister Machine Co., Inc., Fort Wayne, Ind.

[21] Appl. No.: 300,866

[22] Filed: Sep. 2, 1994

Related U.S. Application Data

[63] Continuation of Ser. No. 861,106, Mar. 31, 1992, abandoned.

[51] Int. Cl.$^6$ .................................. B07B 1/34; B07B 1/42
[52] U.S. Cl. ................... 209/326; 209/365.1; 209/365.3; 384/473; 384/480; 384/489
[58] Field of Search ..................................... 209/315, 326, 209/332, 363, 364, 365.2, 365.3, 366, 366.5, 367, 365.1; 384/472, 473, 480, 489

[56] References Cited

U.S. PATENT DOCUMENTS

| | | | |
|---|---|---|---|
| 2,828,014 | 3/1958 | Wantling | 209/326 |
| 2,964,186 | 12/1960 | Ferrara | 209/326 X |
| 3,003,635 | 10/1961 | Wood | 209/365.3 X |
| 3,044,624 | 7/1962 | Parks | 209/326 X |
| 3,089,582 | 5/1963 | Musschoot et al. | 209/365.3 X |
| 3,187,591 | 6/1965 | Johnson | 209/326 X |
| 3,491,881 | 1/1970 | Winquist | 209/326 |
| 4,180,458 | 12/1979 | Shahan | 209/326 |
| 4,272,366 | 6/1981 | Dean et al. | 209/364 |
| 4,529,510 | 7/1985 | Johnson et al. | 209/403 |
| 4,946,307 | 8/1990 | Jakob | 404/91 |

FOREIGN PATENT DOCUMENTS

| 563848 | 9/1958 | Canada | 209/365.3 |

OTHER PUBLICATIONS

"The Ty-Rock Screen"; Catalogue 65; The W. S. Tyler Company.
Portec Kolberg Mfg. Bulletin 1800; Kolberg Series 1800; "Portable Washing-Screening Plants" (Date unknown).
Nordberg One-Page Brochure; "The Portable Cone Plant You Can't Afford Not to Buy!" (Date unknown).
Deister Bulletin No. 290; "Inclined Scalping and Sizing Vibrating Screens from Drum Mix Asphalt Plants", Apr. 1988.
Deister Bulletin No. 310; "Heavy Duty Horizontal Vibrating Screens" (Date unknown).

*Primary Examiner*—William E. Terrell
*Assistant Examiner*—Tuan Nguyen
*Attorney, Agent, or Firm*—Barnes & Thornburg

[57] ABSTRACT

A vibrating screen apparatus capable of maintaining operation when in an out-of-level orientation is disclosed. The apparatus includes a generally rigid frame having first and second sidewalls and top and bottom screen decks extending therebetween. The frame is coupled to a stationary chassis or base by spring mount assemblies that each include an adjustable spring support system coupled to the frame and heavy coil springs which are positioned between the adjustable spring support system and the stationary base. Four rubber shear spring assemblies are also coupled between the stationary base and the sidewalls. The rubber shear spring assemblies help prevent shifting of the frame relative to the base if an out-of-level condition occurs and also help reduce lateral forces applied to the coil springs caused during out-of-level conditions. The apparatus further includes eccentric drive and driven shafts that are rotatably supported by spherical roller bearings. First and second oil housings are located adjacent the respective first and second sidewalls and define oil chambers to lubricate the shaft bearings. Labyrinth seals are located on the shafts adjacent each bearing and are designed to prevent lubricating oil from passing beyond them. O-rings are coupled to each of the shafts adjacent the labyrinth seals and are designed to direct lubricating oil which passes beyond the labyrinth seals into supplemental oil collection pockets that direct the lubricating oil to the oil chambers of the oil housings for re-use in lubricating the bearings.

35 Claims, 2 Drawing Sheets

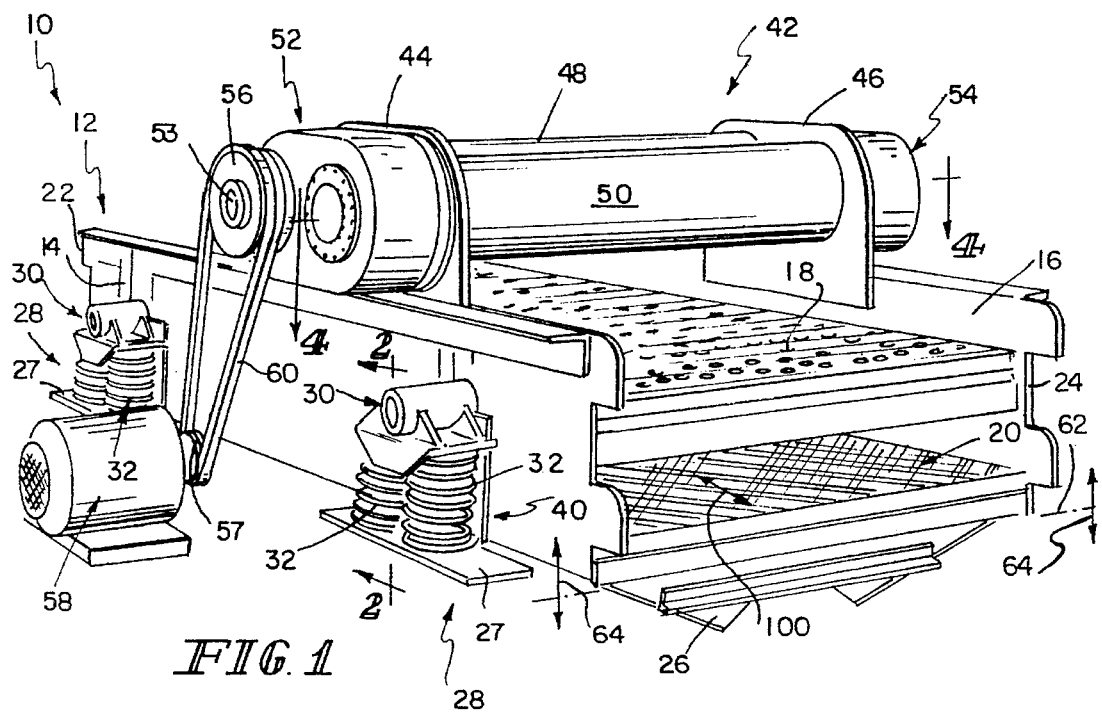
FIG. 1
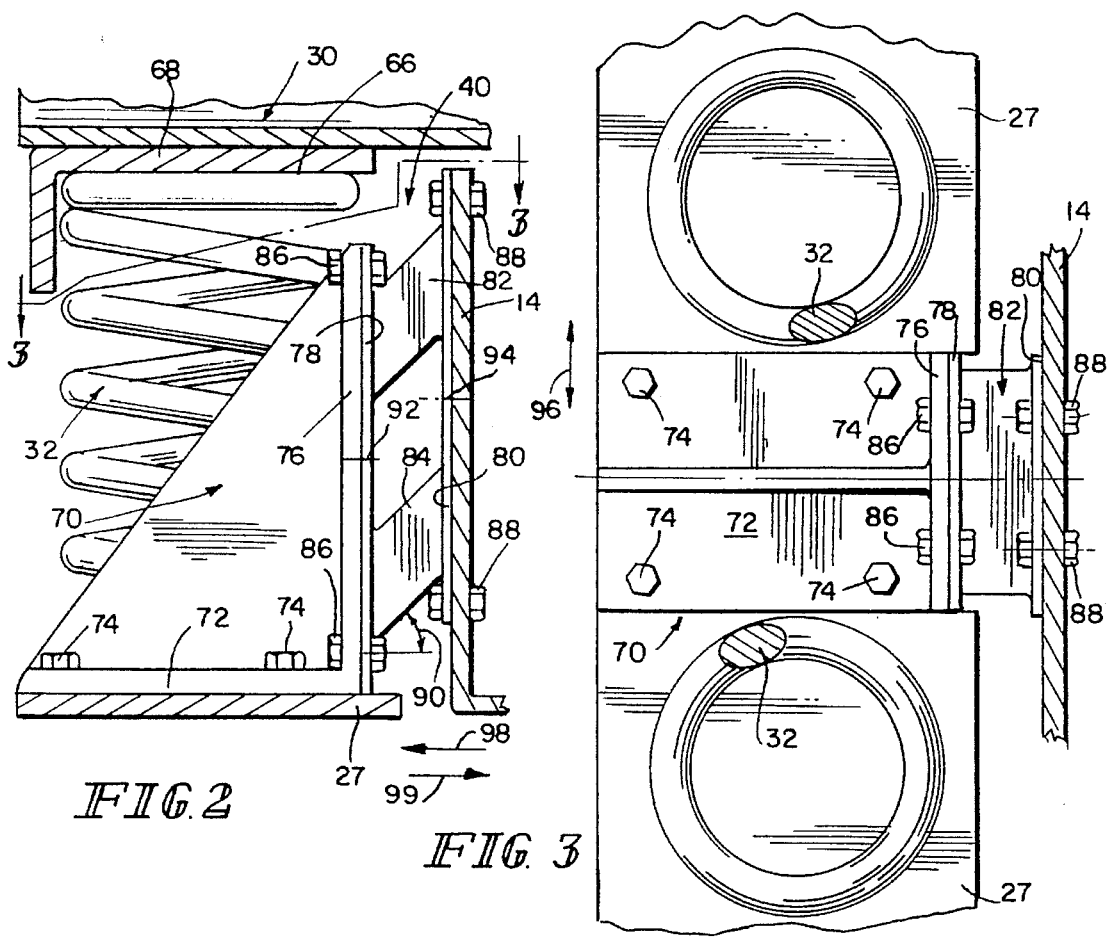
FIG. 2
FIG. 3

VIBRATING SCREEN APPARATUS FOR USE IN NON-LEVEL OPERATING CONDITIONS

This is a Continuation of application Ser. No. 07/861,106, filed Mar. 31, 1992, now abandoned.

BACKGROUND AND SUMMARY OF THE INVENTION

The present invention relates to a vibrating screen apparatus. More particularly, the present invention relates to a vibrating screen apparatus capable of maintaining operation when the vibrating apparatus is in an out-of-level orientation.

Vibrating screens for separating particulate matter into various sizes are well known. Particulate matter is typically placed on a screen deck of the vibrating screen. The screen is formed to include a plurality of openings having a predetermined size. Pieces of the particulate matter which are smaller than the predetermined size fall through the openings in the screen deck. Pieces of the particulate matter which are larger than the predetermined size of the openings move across the screen deck to a location separate from the smaller pieces. The vibrating screen decks are typically coupled to a rigid frame. The frame is vibrated by a vibrating mechanism coupled to the frame. Conventional vibrating mechanisms include an eccentric shaft which is rotated within a shaft housing. The lower portion of the shaft housing typically serves as an oil reservoir across its entire length. The oil in the oil reservoir is agitated by oil slingers located on the eccentric shaft. Therefore, oil constantly envelopes spherical roller bearings coupled to the eccentric shaft and all other moving parts located inside the shaft housing. Oil lubrication of the shaft bearings is preferred over grease lubrication. Oil is continuously splashed into the bearings coupled to the shaft of the vibrating mechanism. Bearings lubricated with oil are typically more reliable and have higher dynamic capacities than bearings lubricated with grease.

Several uses have been developed for vibrating screens. One such use is on a movable asphalt pavement recycling apparatus. One such movable asphalt pavement recycling apparatus is described in U.S. Pat. No. 4,946,307. The apparatus described in the '307 patent uses a vibrating screen to separate asphalt particles removed from a road surface by a milling drum. A vertical bucket type conveyor supplies asphalt particles cut from the road by the milling drum to the vibrating screen. Smaller asphalt particles fall through the vibrating screen to a conveyor and are deposited on the road ahead of a resurfacing machine. Larger particles pass over the vibrating screen and are reapplied to the road upstream from the milling drum so that the milling drum grinds the particles into smaller pieces.

Problems arise when operating a vibrating screen on a movable apparatus such as the movable asphalt pavement recycling apparatus discussed above. The road being recycled is typically crowned in the center to promote drainage. This crown can cause an out-of-level condition for the recycling apparatus and for the vibrating screen coupled to the recycling apparatus.

Conventional vibrating mechanisms which are used to vibrate screens include an oil bath incorporated in an eccentric shaft housing which spans the entire width of the vibrating screen frame. If an out-of-level condition occurs in a conventional vibrating mechanism, oil moves toward the lower end of the shaft housing. Therefore, the lower end of the shaft housing has a deeper oil level than the higher end of the shaft housing. This out-of-level condition can cause lubricant starvation of the bearing on the high side of the vibrating mechanism and over-lubrication of the bearing on the low side of the vibrating mechanism. Both lubricant starvation and over-lubrication can damage the bearings coupled to the eccentric drive shaft. When bearings at both ends of the drive shaft share a common oil bath, all the bearings are contaminated and need to be replaced if a single bearing fails.

The vibrating screen apparatus of the present invention includes an improved vibrating mechanism designed to reduce the problems associated with a conventional vibrating mechanism when an out-of-level condition occurs. The vibrating mechanism of the present invention includes a drive shaft, a driven shaft, and two separate oil baths. A first oil bath is located at a first end of the vibrating mechanism adjacent a first pair of bearings coupled to a first end of the drive shaft and the driven shaft. A second oil bath is located at a second end of the vibrating mechanism adjacent a second pair of bearings coupled to a second end of the drive shaft and driven shaft. Therefore, if the vibrating screen apparatus is out-of-level, the depth of the oil in the two oil baths will not change substantially in the limited area of the two oil baths surrounding the bearings. In addition, only two bearings share a common oil bath. Therefore, if bearing failure occurs, only the two bearings that share the common oil bath would be contaminated and need to be replaced.

One feature of the present invention is the provision of oil retention means to prevent the loss of oil and to prevent oil from migrating down the eccentric shaft from one oil bath to the other oil bath through the shaft housing. The vibrating mechanism of the present invention includes internal labyrinth seals configured to prevent oil from passing along the shafts past the seals and out of the oil baths. However, some amount of leakage past the seals is typically present. Oil which passes a labyrinth seal coupled to the shaft is propelled radially outwardly off the shaft by an O-ring coupled to the shaft and into an oil collection pocket formed in the shaft housing. When the oil level in the oil collection pocket rises above a predetermined level, the oil flows through a drain back into the oil bath adjacent the oil collection pocket.

Another feature of the present invention is the provision of rubber shear spring assemblies mounted as side stabilizers on the frame of the vibrating screen. The rubber shear spring assemblies are formed from a flexible rubber element permanently bonded to steel mounting plates on either side of the flexible rubber material. The rubber shear spring assemblies are preferably mounted in a central position behind main support coil springs. The rubber shear spring assemblies are relatively free to oscillate and deflect in shear, which is parallel to the faces of the mounting plates. However, the rubber shear spring assemblies are generally rigid in compression and in tension. Therefore, the rubber shear spring assemblies permit the vibrating frame to move up and down. However, the rubber shear spring assemblies resist sideways movement of the frame when an out-of-level occurs. If the frame begins to shift due to an out-of-level condition, rubber shear spring assemblies on the low side of the frame are compressed and the rubber shear spring assemblies on the high side of the frame are tensioned.

The forces exerted by the rubber shear spring assemblies tend to maintain a true plane of vibrating motion for the frame, thereby reducing the likelihood of structural damage to the frame which can occur from twisting caused by non-planar vibratory motion. In addition, steel coil springs which connect the frame to a base do not handle lateral loading well. Over time coil springs which are laterally loaded will wear unevenly. The rubber shear spring assemblies of the present invention reduce lateral forces on the coil springs resulting from an out of level condition of the base, thereby increasing the life of the coil springs.

Other objects, advantages and novel features of the present invention will become apparent from the following detailed description of the invention when considered in conjunction with the accompanying drawings.

BRIEF DESCRIPTION OF THE DRAWINGS

FIG. 1 is a perspective view of a vibrating screen apparatus of the present invention including a vibrating mechanism for vibrating a frame and a screen deck and spring mount assemblies for coupling the frame of the vibrating screen apparatus to a stationary base.

FIG. 2 is a sectional view taken along lines 2—2 of FIG. 1 illustrating rubber shear spring assemblies coupled between the base and a side wall of the frame.

FIG. 3 is a sectional view taken along lines 3—3 of FIG. 2 further illustrating the configuration of the rubber shear spring assemblies and illustrating the position of the rubber shear spring assemblies relative to a spring mount assembly.

DETAILED DESCRIPTION OF THE DRAWINGS

Figure 4:
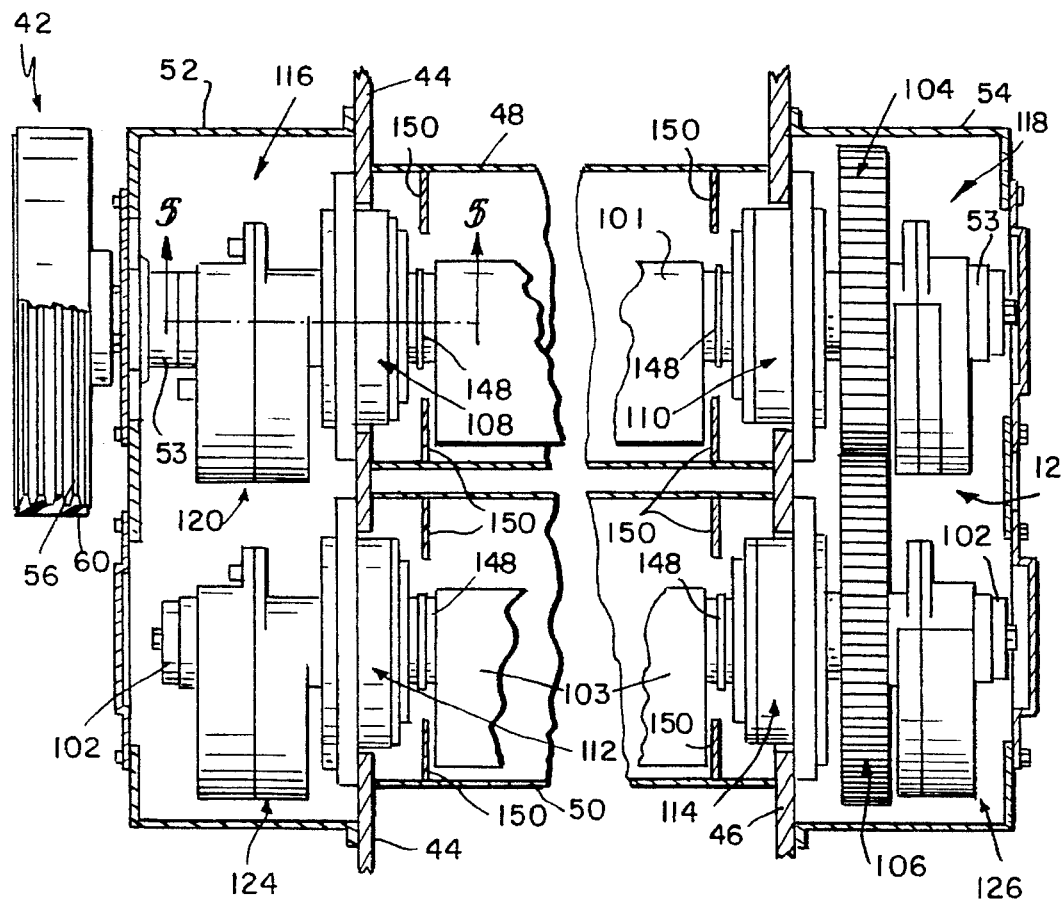
FIG. 4 is a sectional view taken along lines 4—4 of FIG. 1 illustrating the configuration of the vibrating mechanism of the present invention which includes two separate oil housings defining separate oil chambers located at opposite ends of the vibrating mechanism.

Referring now to the drawings, FIG. 1 illustrates a vibrating screen apparatus 10 of the present invention. Vibrating screen apparatus 10 includes a generally rigid frame 12 having a first side wall 14 and a second side wall 16 spaced apart from first side wall 14. A top screen deck 18 extends between first and second side walls 14 and 16. In addition, a bottom screen deck 20 extends between opposite side walls 14 and 16 of frame 12. Frame 12 includes an inlet end 22 and an outlet end 24. Screen deck 18 is formed to include a plurality of apertures therein to permit pieces of particulate matter smaller than the apertures to fall through screen deck 18. Screen deck 20 is also formed to include a plurality of apertures therein to permit pieces of particulate matter smaller than the apertures to fall through screen deck 20. Apertures in screen deck 18 are larger than the apertures in screen deck 20. A discharge hopper 26 is coupled to frame 12 below screen deck 20. Therefore, vibrating screen apparatus 10 illustrated in FIG. 1 separates particulate matter into three separate size ranges. Large particles pass over screen deck 18 and are discharged at end 22 of the frame. Medium size particles fall through screen deck 18 but pass over screen deck 20 and are discharged at end 22 of frame 12. Small particles pass through both screen decks 18 and 20 and into discharge hopper 26.

Frame 12 is coupled to a stationary chassis or base 27 by four spring mount assemblies 28 located near each of the four corners of the frame 12. Spring mount assemblies 28 include an adjustable spring support system 30 coupled to frame 12 and heavy coil springs 32 positioned between adjustable spring support system 30 and stationary base 27. Four rubber shear spring assemblies 40 are also coupled between the stationary base 27 and the side walls 14 and 16 of vibrating frame 12.

A vibrating mechanism 42 is coupled to side walls 14 and 16 of frame 12 by coupler plates 44 and 46, respectively. Vibrating mechanism 42 includes separate cylindrical shaft housings 48 and 50. In addition, vibrating mechanism 42 includes a first oil housing 52 located adjacent side wall 14 of frame 12 and a second oil housing 54 located adjacent second side wall 16 of frame 12. An eccentric drive shaft 53 is located within housing 48 of vibrating mechanism 42. A drive wheel 56 is coupled to drive shaft 53. A drive shaft 57 of motor 58 is coupled to drive wheel 56 by drive belt 60 to rotate drive shaft 53.

As discussed above, vibrating screen assemblies are typically designed to be placed on a substantially level support surface such as base 27. However, when the support surface becomes out of level, the vibrating frame 12 and spring mount assemblies 28 can be damaged due to the out-of-level condition. In addition, conventional vibrating mechanisms which include a single oil bath incorporated in the eccentric shaft housing spanning the width of the frame can be damaged if an out-of-level condition occurs. Oil can move to the low side of the frame and over lubricate the shaft bearings on the low side of the frame. In addition, the bearings on the high side of the frame may not get enough oil and may be damaged if an out-of-level condition occurs. As illustrated in FIG. 1, the frame 12 is configured to be aligned in a level condition illustrated by line 62. If the stationary base 27 becomes unlevel by moving in the direction of double-headed arrows 64, the frame 12 will tend to shift laterally relative to stationary base 27. Therefore, an out-of-level condition can damage frame 12, spring mount assemblies 28, and vibrating mechanism 42.

The present invention is designed to compensate for out-of-level conditions to reduce the likelihood of damage to frame 12, spring mount assemblies 28, and vibrating mechanism 42. The rubber shear spring assemblies 40 coupled between the base 27 and the side walls 14 and 16 of frame 12 help to prevent shifting of frame 12 relative to stationary base 27 if an out of level condition occurs. Rubber shear spring assemblies 40 are best illustrated in FIGS. 2 and 3. As illustrated in FIG. 2, a top surface 66 of coil spring 32 abuts a support plate 68 of adjustable spring support system 30. A bottom surface of coil spring 32 engages base 27. An angle iron coupler plate 70 includes a horizontal plate 72 coupled to base 27 by fasteners 74. Coupler plate 70 also includes a vertical plate 76. Rubber shear spring assemblies 40 are coupled between vertical plate 76 and the side walls 14 and 16 of frame 12. FIG. 2 illustrates rubber shear spring assembly 40 coupled to first side wall 14 of frame 12. It is understood that the rubber shear spring assemblies coupled to second side wall 16 of frame 12 which are not seen in FIG. 1 are coupled to side wall 16 in an identical manner.

Rubber shear spring assembly 40 illustrated in FIGS. 2 and 3 includes a first thin steel mounting plate 78 and a second thin steel mounting plate 80. Rubber elements or shear springs 82 and 84 are permanently bonded to steel plates 78 and 80. Vertical coupler plate 76 is coupled to first steel plate 78 by fasteners 86. Side wall 14 of frame 12 is coupled to second steel plate 80 by fasteners 88. Rubber shear springs 82 and 84 are inclined at an angle of about 45° relative to stationary base 27 as illustrated by angle 90 in FIG. 2. In the illustrated embodiment, rubber shear springs 82 and 84 have the shape of an oblique rectangular prism. It is understood, however, that other shapes may be used for the rubber shear springs 82 and 84 in accordance with the present invention. Each of the rubber shear springs 82 and 84 has a 500 pounds per inch rating. Therefore, the rubber mount assemblies 40 which include two rubber shear springs 82 and 84 have a rating of 1000 pounds per inch. Depending on the application of vibrating screen apparatus 10, a single rubber shear spring 82 or 84 may be used. When a single rubber shear spring 82 or 84 is used, steel plates 78 and 80 are cut along dotted lines 92 and 94, respectively. A single shear spring 82 or 84 is then coupled between vertical plate 76 and side wall 14 of frame 12. Rubber shear spring assemblies 40 are illustratively Part No. TO-108-7 (dual springs) or Part No. TO-108-2 (single spring) shear spring assemblies available from MOR-RYDE Inc. of Elkhart, Ind.

Rubber shear springs 82 and 84 are relatively free to oscillate and deflect in shear which is parallel to steel plates 78 and 80 as illustrated in the direction of double headed arrow 96 in FIG. 2. However, shear springs 82 and 84 are rigid in compression and tension. In other words, shear springs 82 and 84 tend to resist a compressive force in the direction of arrow 98. Shear springs 82 and 84 also tend to resist a tension force in the direction of arrow 99. Therefore, shear springs 82 and 84 reduce the likelihood that frame 12 will shift sideways relative to stationary base 27 due to an out-of-level condition of base 27. An out-of-level condition results in compression of rubber shear springs 82 and 84 coupled to the low side of frame 12 and results in tensioning of rubber shear springs 82 and 84 coupled to the high side of frame 12. The forces exerted by rubber shear springs 82 and 84 tend to maintain a true plane of vibrating motion for frame 12, thereby reducing the likelihood of structural damage to frame 12 that can occur due to twisting caused by non-planar vibration of frame 12.

Rubber shear springs 82 and 84 also resist movement of the frame 12 in a longitudinal direction relative to base 27 as illustrated by double-headed arrow 100 in FIG. 1. This longitudinal movement of frame 12 can occur when base 27 is longitudinally out-of-level along the length of frame 12. For example, if a recycling apparatus including the vibrating screen assembly 10 is moved up or down a steep hill, frame 12 can become longitudinally out-of-level. Shear springs 82 and 84 reduce the likelihood that frame 12 will shift longitudinally relative to base 27 in the direction of arrow 100. In other words, shear springs 82 and 84 also reduce longitudinally directed lateral forces on spring mount assemblies 28.

A rubber shear spring assembly 40 is preferably centered between adjacent coil springs 32 of each spring mount assembly 28. However, if required, rubber shear spring assemblies 40 may be mounted in a position spaced apart from spring mount assemblies 28. As discussed above, coil springs 32 tend to wear unevenly if lateral loads are applied to springs 32. Rubber shear spring assemblies 40 tend to reduce the lateral load forces applied to springs 32 resulting from a non-level condition and increase the life of springs 32.

The rubber shear spring assemblies 40 illustrated in FIGS. 1–3 do not support a significant part of the vertical load applied by frame 12. The steel coil springs 32 are the primary load carrying members. In certain applications, however, rubber shear spring assemblies 40 may be used to provide the only vertical load bearing spring elements. In other words, for certain applications, spring mount assemblies 28 are not required.

Figure 5:
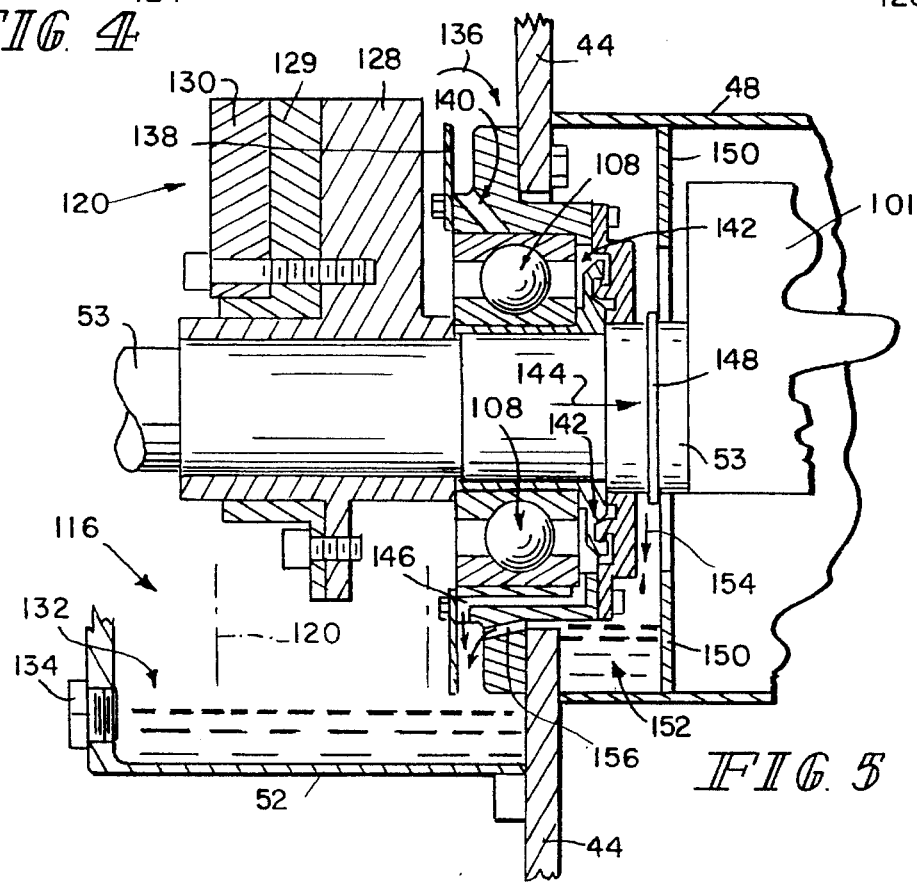
FIG. 5 is a sectional view taken along lines 5—5 of FIG. 4 illustrating a sealing arrangement for the eccentric shafts of the vibrating mechanism and illustrating an oil recovery system to prevent oil from migrating along the shaft into the shaft housing.

The vibrating mechanism 42 of the present invention is illustrated in detail in FIGS. 4–6. Referring to FIG. 4, the vibrating mechanism 42 includes two separate shaft housings 48 and 50. First housing 48 houses drive shaft 53 therein. An eccentric weight 101 is coupled to drive shaft 53. Second housing 50 houses a driven shaft 102 therein. An eccentric weight 103 is coupled to driven shaft 102. Eccentric drive shaft 53 is coupled to drive wheel 56. Drive belt 60 rotates drive wheel 56 to rotate eccentric drive shaft 53. Eccentric drive shaft 53 includes a helical gear 104 which is meshed with a helical gear 106 coupled to eccentric shaft 102. Therefore, rotation of eccentric drive shaft 53 by drive wheel 56 also causes rotation of eccentric driven shaft 102. Drive shaft 53 includes a spherical roller bearing 108 adjacent side wall 14 and a spherical roller bearing 110 adjacent side wall 16. Driven shaft 102 includes a spherical bearing 112 adjacent side wall 14 and a spherical bearing 114 adjacent side wall 16. First oil housing 52 defines a first oil chamber 116 adjacent bearings 108 and 112 to lubricate bearings 108 and 112. Second oil housing 54 located at the opposite side of vibrating mechanism 42 defines a second oil chamber 118 adjacent bearings 110 and 114. Second oil chamber 118 includes oil which provides an oil bath to lubricate bearings 110 and 114. By providing separate oil housings 52 and 54 on opposite sides of vibrating mechanism 42, vibrating mechanism 42 reduces the likelihood of over-lubrication or under-lubrication of bearings 108, 110, 112, and 114 during a non-level condition of vibrating mechanism 42.

Counterweights 120 and 122 are coupled to opposite ends of eccentric shaft 53 located inside oil chambers 52 and 54. Counterweights 124 and 126 are coupled to opposite ends of eccentric shaft 102 located inside oil housings 52 and 54, respectively. Counterweights 120, 122, 124, and 126 can be adjusted depending upon the amount of vibration desired. As best illustrated in FIG. 5, counterweight 120 includes a main counterweight section 128 and adjustable counterweight sections 129 and 130.

It is important in vibrating mechanism 42 that oil not migrate from oil chambers 116 and 118 into the shaft housings 48 and 50. Migration of oil into the shaft housings 48 and 50 would reduce the supply of oil to bearings 108, 110, 112, and 114. FIG. 5 illustrates the configuration of the oil-retention mechanism of the present invention. Only the configuration of oil-retention mechanism adjacent bearing 108 will be explained in detail. The oil-retention mechanisms adjacent the other three bearings 110, 112, and 114 are identical to the oil-retention mechanism adjacent bearing 108.

As illustrated in FIG. 5, rotation of eccentric shaft 53 causes rotation of counterweight 120 which is rigidly coupled to shaft 53. Oil 132 is added to oil chamber 116. A sight glass 134 is coupled to oil housing 52. The level of oil 132 in housing 52 is preferably halfway up sight glass 134. As counterweights 120 rotate inside oil chamber 116, the counterweights 120 pass through the oil 132 as illustrated by dotted lines 120 in FIG. 5. This causes counterweights 120 to be coated with oil 132. As counterweights 120 continue rotation, counterweights 120 sling oil throughout oil chamber 116. Some quantity of the oil 132 passes in the direction of arrow 136. An oil catch plate 138 directs the oil through a channel 140 to lubricate bearing 108. A labyrinth seal 142 on shaft 53 coupled to shaft 53 is designed to prevent oil from passing beyond the labyrinth seal 142 in the direction of arrow 144. Therefore, most of the oil which lubricates bearing 108 passes through drain 146 back into oil chamber 116. However, some oil may pass labyrinth seal 142 on shaft 53 in the direction of arrow 144.

An O-ring 148 is coupled to eccentric shaft 53 adjacent labyrinth seal 142. An internal baffle 150 is provided inside housing 48 to define a supplemental oil collection chamber or pocket 152 between baffle 150 and coupler plate 44. Oil passing in the direction of arrow 144 on shaft 53 meets O-ring 148 which is mounted in a machined groove formed in shaft 53. Oil which hits O-ring 148 is propelled radially outwardly away from shaft 53 in the direction of arrow 154. This oil enters supplemental oil collection pocket 152. When the oil in supplemental oil collection pocket 152 reaches a predetermined level, the oil flows through a drain 156 back into oil chamber 116. Therefore, the combination of labyrinth seal 142, drain 146, O-ring 148, baffle 150, oil collection pocket 152, and drain 156 provides means for preventing migration of oil from oil chamber 116 into the shaft housing 48. In other words, oil moving past seal 142 on shaft 53 is collected and returned to oil chamber 116. This reduces the likelihood that bearing 108 will be damaged if an out-of-level condition occurs.

An O-ring 148 and a baffle 150 are also provided adjacent the bearings 110, 112, and 114. These baffles 150 and O-rings 148 operate in an identical manner to the baffle 150 and O-ring 148 discussed in detail with reference to FIG. 5 to prevent oil from migrating from oil chambers 116 or 118 into shaft housings 48 or 50. It is understood that structures other than O-rings 148 can be used to propel oil radially outwardly from the shafts 53 and 102 into oil collection pockets 152. For example, an outwardly projecting ridge can be machined into shafts 53 and 102 adjacent each oil housing 52 and 54. In addition, a square ring, a triangular ring, or any type of lip, bump, or ridge may be used in accordance with the present invention to propel oil from shafts 52 and 102 into collection pockets 153.

Although the preferred embodiment of the present invention includes two eccentric shafts 53 and 102, it is understood that a single eccentric shaft can be used to vibrate frame 12 for certain applications. In other applications, when heavy vibration is required, three eccentric shafts can be used to vibrate frame 12. In addition, the vibrating mechanism 42 of the present invention may be used with other types of vibrating screens such as inclined vibrating screens.

From the preceding description of the preferred embodiments, it is evident that the objects of the invention are obtained. Although the invention has been described and illustrated in detail, it is understood that the same is intended by way of illustration and example only and is not to be taken by way of limitation. The spirit and scope of the invention are to be limited only by the terms of the appended claims.

What is claimed is:

1. A vibrating screen apparatus comprising:

a base;

a frame;

a screen deck coupled to the frame;

means for vibrating the frame and the screen deck; and a plurality of rubber shear spring assemblies coupled between the frame and the base, each rubber shear spring assembly including a rubber element configured to deflect upon application of a shear force, thereby permitting vibrating movement of the frame relative to the base in a direction substantially perpendicular to the base, and each rubber element also configured to resist compressive and tensile forces thereby limiting lateral movement of the frame relative to the base during non-level conditions of the base.

2. The apparatus of claim 1, wherein each rubber shear spring assembly includes a first plate for coupling the rubber element to the base and a second plate spaced apart from the first plate for coupling the rubber element to the frame.

3. The apparatus of claim 2, wherein each rubber element is aligned at an angle of about 45 degrees relative to the base.

4. The apparatus of claim 2, wherein the rubber element has the shape of an oblique rectangular prism.

5. The apparatus of claim 4, wherein a face of the oblique rectangular prism shaped rubber element is aligned at an angle of about 45 degrees relative to the base.

6. The apparatus of claim 1, wherein the vibrating means comprises:

an eccentric drive shaft;

a bearing coupled to the drive shaft;

means for rotating the drive shaft to vibrate the frame and the screen deck;

an oil housing coupled to an end of the drive shaft adjacent the bearing to provide an oil chamber for lubricating the bearing;

a seal coupled to the drive shaft to prevent oil from passing out of the oil housing on the drive shaft; and means for capturing oil which moves past the seal on the drive shaft and returning the captured oil to the oil housing.

7. The apparatus of claim 6, further comprising a shaft housing surrounding the drive shaft, and wherein the capturing and returning means includes a baffle coupled to the shaft housing adjacent the oil housing to define an oil collection pocket in the shaft housing.

8. The apparatus of claim 7, wherein the capturing and returning means also includes a drain extending between the oil collection pocket and the oil housing for returning oil from the oil collection pocket to the oil housing.

9. The apparatus of claim 7, wherein the capturing and returning means also includes means for propelling oil moving past the seal on the shaft radially outwardly away from the shaft and into the oil collection pocket.

10. The apparatus of claim 9, wherein propelling means includes an O-ring coupled to the drive shaft adjacent the oil collection pocket.

11. A vibrating screen apparatus comprising:

a base;

a frame;

a screen deck coupled to the frame;

means for vibrating the frame and the screen deck; and a plurality of rubber shear spring assemblies, each including a rubber element coupled between the frame and the base so that a first plane in which that rubber element lies is substantially perpendicular to both a second plane in which the frame lies and a third plane in which the base lies, the rubber shear spring assemblies permitting vibrating movement of the frame relative to the base in a direction substantially perpendicular to the base and resisting lateral movement of the frame relative to the base resulting from a non-level condition of the base.

12. A vibrating screen apparatus comprising:

a base;

a frame;

a screen deck coupled to the frame;

means for vibrating the frame and the screen deck; and a plurality of rubber shear spring assemblies coupled between the frame and the base, each rubber shear spring assembly permitting vibrating movement of the frame relative to the base in a direction substantially perpendicular to the base, each rubber shear spring assembly resisting compressive and tensile forces thereby limiting lateral movement of the frame relative to the base during non-level conditions of the base, and each rubber shear spring assembly including a first plate for coupling the rubber shear spring assembly to the base, a second plate spaced apart from the first plate for coupling the rubber shear spring assembly to the frame, and a rubber element coupled to both the first and second plates and having the shape of an oblique rectangular prism.

13. The apparatus of claim 12, wherein a face of the oblique rectangular prism shaped rubber element is aligned at an angle of about 45 degrees relative to the base.

14. A vibrating screen apparatus comprising:

a base;

a frame;

a screen deck coupled to the frame;

means for vibrating the frame and the screen deck; and a plurality of rubber shear spring assemblies coupled between the frame and the base, each rubber shear spring assembly permitting vibrating movement of the frame relative to the base in a direction substantially perpendicular to the base and each rubber shear spring assembly resisting compressive and tensile forces thereby limiting lateral movement of the frame relative to the base during non-level conditions of the base;

wherein the vibrating means comprises:

an eccentric drive shaft;

a shaft housing surrounding the drive shaft;

a bearing coupled to the drive shaft;

means for rotating the drive shaft to vibrate the frame and the screen deck;

an oil housing coupled to an end of the drive shaft adjacent the bearing to provide an oil chamber for lubricating the bearing;

a seal coupled to the drive shaft to prevent oil from passing out of the oil housing on the drive shaft; and means for capturing oil which moves past the seal on the drive shaft and returning the captured oil to the oil housing, the capturing and returning means including a baffle coupled to the shaft housing adjacent the oil housing to define an oil collection pocket in the shaft housing.

15. The apparatus of claim 14, wherein the capturing and returning means also includes a drain extending between the oil collection pocket and the oil housing for returning oil from the oil collection pocket to the oil housing.

16. The apparatus of claim 14, wherein the capturing and returning means also includes means for propelling oil moving past the seal on the shaft radially outwardly away from the shaft and into the oil collection pocket.

17. The apparatus of claim 16, wherein propelling means includes an O-ring coupled to the drive shaft adjacent the oil collection pocket.

18. A vibrating screen apparatus comprising:

a base;

a frame;

a screen deck coupled to the frame;

a plurality of spring mounts coupled between the frame and the base for supporting the frame;

means for vibrating the frame and the screen deck; and means for reducing lateral forces on the spring mounts resulting from a non-level condition of the base, said means including a rubber shear spring assembly coupled between the frame and the base adjacent each spring mount;

wherein each spring mount includes a coil spring coupled between the base and the frame and a rubber shear spring assembly is coupled between the frame and the base adjacent the coil spring.

19. A vibrating screen apparatus comprising:

a base;

a frame;

a screen deck coupled to the frame;

a plurality of spring mounts coupled between the frame and the base for supporting the frame;

means for vibrating the frame and the screen deck; and means for reducing lateral forces on the spring mounts resulting from a non-level condition of the base, said means including a rubber shear spring assembly coupled between the frame and the base adjacent each spring mount, each rubber shear spring assembly including a first plate for coupling the rubber shear spring assembly to the base, a second plate spaced apart from the first plate for coupling the rubber shear spring assembly to the frame, and a rubber element coupled to both the first and second plates and having the shape of an oblique rectangular prism.

20. The apparatus of claim 19, wherein a face of the oblique rectangular prism shaped robber element is aligned at an angle of about 45 degrees relative to the base.

21. A vibrating screen apparatus comprising:

a base;

a frame;

a screen deck coupled to the frame;

a plurality of spring mounts coupled between the frame and the base for supporting the frame;

means for vibrating the frame and the screen deck; and means for reducing lateral forces on the spring mounts resulting from a non-level condition of the base, said means including a rubber shear spring assembly coupled between the frame and the base adjacent each spring mount;

wherein each spring mount includes a coil spring coupled between the base and the frame and the means for reducing lateral forces on the spring mounts is coupled between the frame and the base adjacent the coil spring.

22. A vibrating screen apparatus comprising:

a base;

a frame;

a screen deck coupled to the frame;

a plurality of spring mounts coupled between the frame and the base for supporting the frame;

means for vibrating the frame and the screen deck; and means for reducing lateral forces on the spring mounts resulting from a non-level condition of the base, said means including a rubber shear spring assembly coupled between the frame and the base adjacent each spring mount;

wherein each spring mount includes two spaced apart coil springs coupled between the base and the frame and the means for reducing lateral forces on the spring mounts is coupled between the frame and the base at a position between the two coil springs.

23. A vibrating screen apparatus comprising:

a base;

a frame;

a screen deck coupled to the frame;

a plurality of spring mounts coupled between the frame and the base for supporting the frame;

means for reducing lateral forces on the spring mounts resulting from a non-level condition of the base, said means including a rubber shear spring assembly coupled between the frame and the base adjacent each spring mount; and means for vibrating the frame and the screen deck, the vibrating means including:

an eccentric drive shaft;

a shaft housing surrounding the drive shaft;

a bearing coupled to the drive shaft;

means for rotating the drive shaft to vibrate the frame and the screen deck;

an oil housing coupled to an end of the drive shaft adjacent the bearing to provide an oil chamber for lubricating the bearing;

a seal coupled to the drive shaft to prevent oil from passing out of the oil housing on the drive shaft; and means for capturing oil which moves past the seal on the drive shaft and returning the captured oil to the oil housing, the capturing and returning means including a baffle coupled to the shaft housing adjacent the oil housing to define an oil collection pocket in the shaft housing.

24. The apparatus of claim 23 wherein the capturing and returning means includes a drain extending between the oil collection pocket and the oil housing for returning oil from the oil collection pocket to the oil housing.

25. The apparatus of claim 23 wherein the capturing and returning means includes means for propelling oil moving past the seal oft the shaft radially outwardly away from the shaft and into the oil collection pocket.

26. The apparatus of claim 25, wherein propelling means includes an O-ring coupled to the drive shaft adjacent the oil collection pocket.

27. A vibrating screen apparatus comprising:

a base;

a frame;

a screen deck coupled to the frame;

a plurality of spring mounts coupled between the frame and the base for supporting the frame in a direction substantially perpendicular to the base, each spring mount including a coil spring coupled between the base and the frame;

means for vibrating the frame and the screen deck; and means for reducing lateral forces on the spring mounts resulting from a non-level condition of the base, said means including a rubber shear spring assembly coupled between the frame and the base adjacent the coil spring and having a rubber element coupled between the frame and the base adjacent each spring mount.

28. The apparatus of claim 27, wherein each rubber shear spring assembly includes a first plate for coupling the rubber element to the base and a second plate spaced apart from the first plate for coupling the rubber element to the frame, and further wherein the rubber element has the shape of an oblique rectangular prism.

29. The apparatus of claim 28, wherein a face of the oblique rectangular prism shaped rubber element is aligned at an angle of about 45 degrees relative to the base.

30. A vibrating screen apparatus comprising:

a base;

a frame;

a screen deck coupled to the frame;

a plurality of spring mounts coupled between the frame and the base for supporting the frame in a direction substantially perpendicular to the base, each spring mount including a coil spring coupled between the base and the frame;

means for vibrating the frame and the screen deck; and means coupled between the frame and the base adjacent the coil spring for reducing lateral forces on the spring mounts resulting from a non-level condition of the base, said means including a rubber shear spring assembly having a rubber element coupled between the frame and the base adjacent each spring mount.

31. A vibrating screen apparatus comprising:

a base;

a frame;

a screen deck coupled to the frame;

a plurality of spring mounts coupled between the frame and the base for supporting the frame in a direction substantially perpendicular to the base, each spring mount including two spaced apart coil springs coupled between the base and the frame;

means for vibrating the frame and the screen deck; and means coupled between the frame and the base at a position between the two coil springs for reducing lateral forces on the spring mounts resulting from a non-level condition of the base, said means including a rubber shear spring assembly having a rubber element coupled between the frame and the base adjacent each spring mount.

32. A vibrating screen apparatus comprising:

a base;

a frame;

a screen deck coupled to the frame;

a plurality of spring mounts coupled between the frame and the base for supporting the frame in a direction substantially perpendicular to the base;

means for vibrating the frame and the screen deck, the vibrating means including an eccentric drive shaft, a bearing coupled to the drive shaft, means for rotating the drive shaft to vibrate the frame and the screen deck, an oil housing coupled to an end of the drive shaft adjacent the bearing to provide an oil chamber for lubricating the bearing, a seal coupled to the drive shaft to prevent oil from passing out of the oil housing on the drive shaft, and means for capturing oil which moves past the seal on the drive shaft and returning the captured oil to the oil housing, the capturing and returning means including a baffle coupled to the shaft housing adjacent the oil housing to define an oil collection pocket in the shaft housing;

means for reducing lateral forces on the spring mounts resulting from a non-level condition of the base, said means including a rubber shear spring assembly having a rubber element coupled between the frame and the base adjacent each spring mount; and a shaft housing surrounding the drive shaft.

33. The apparatus of claim 32, wherein the capturing and returning means includes a drain extending between the oil collection pocket and the oil housing for returning oil from the oil collection pocket to the oil housing.

34. The apparatus of claim 32, wherein the capturing and returning means includes means for propelling oil moving past the seal on the shaft radially outwardly away from the shaft and into the oil collection pocket.

35. The apparatus of claim 34, wherein propelling means includes an O-ring coupled to the drive shaft adjacent the oil collection pocket.

* * * * *